Feb. 24, 1942.   P. D. GANDILLON   2,274,235
EXTENSION BRACKET
Filed Dec. 3, 1941   2 Sheets-Sheet 1

Inventor
P. D. Gandillon,
By Seymour, Bright & Nottingham
Attorneys

Feb. 24, 1942.   P. D. GANDILLON   2,274,235
EXTENSION BRACKET
Filed Dec. 3, 1941     2 Sheets-Sheet 2

Inventor
P. D. Gandillon,
By Seymour, Bright & Nottingham
Attorneys

Patented Feb. 24, 1942

2,274,235

UNITED STATES PATENT OFFICE 2,274,235

EXTENSION BRACKET

Percy D. Gandillon, Gainesville, Tex.

Application December 3, 1941, Serial No. 421,513

6 Claims. (Cl. 123—198)

This invention relates to brackets, and more particularly to an adjustable or extension bracket adapted to fit all engine head bolts, regardless of the spacing of such bolts.

One of the objects of the invention is to provide a novel bracket of simple and inexpensive construction which may be readily attached to the head bolts of engines of various sizes, so that various articles may be mounted on the engine.

A further object is to supply a bracket that may be readily used for mounting a relay or the like on an engine head, or which can be used for the support of small electric fans, electric motors, etc.

Another object is to furnish a practical supporting device, and one which will be exceedingly effective for the purpose for which it is designed.

With the foregoing objects outlined and with other objects in view which will appear as the description proceeds, the invention consists in the novel features hereinafter described in detail, illustrated in the accompanying drawings, and more particularly pointed out in the appended claims.

Figure 2:
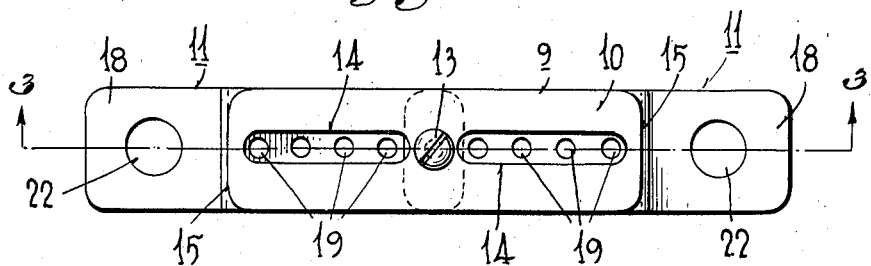
Fig. 2 is an enlarged plan view of the bracket.
Figure 3:
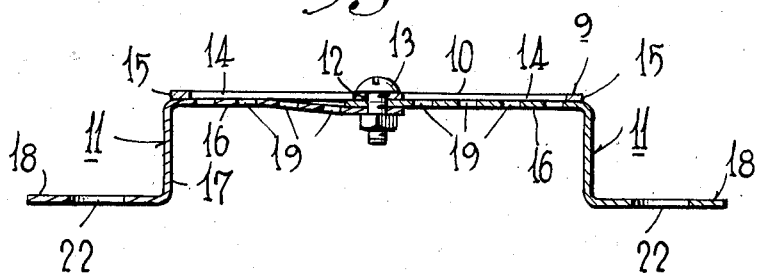
Fig. 3 is a longitudinal vertical sectional view taken on the line 3—3 of Fig. 2.

Referring to the drawings, 7 designates a conventional engine block provided with the usual head bolts 8 which may be employed in securing my bracket 9 to the engine. As shown in Figs. 2 and 3, the bracket preferably consists of a flat intermediate member 10 and angular end members 11. The flat member is provided midway of its ends with an aperture 12 for the reception of a bolt 13 employed in securing the flat member to the angular members. At opposite sides of the hole 12, the flat member is provided with slots 14 which extend lengthwise of the member along the medial line of the same, and from points adjacent to the aperture 12 to points in close proximity to the ends 15 of the flat member.

Each of the end members has a flat top portion 16, a vertical leg 17 and a foot 18, the latter being flat and arranged substantially parallel to the top portion of the member. Each top portion is provided with a row or series of apertures 19 arranged lengthwise of the medial part of said top portion, and registering with one of the slots 14 of the flat member. The bolt 13 may be passed through any of the holes 19 in making the bracket shorter or longer to accommodate various mounting bolts 8. The slots 14 and holes 19 are designed to accommodate bolts 20 (Fig. 1) employed in securing a relay 21 or other article to the bracket. Each foot 18 has a hole 22 to accommodate bolts 8.

Figure 1:
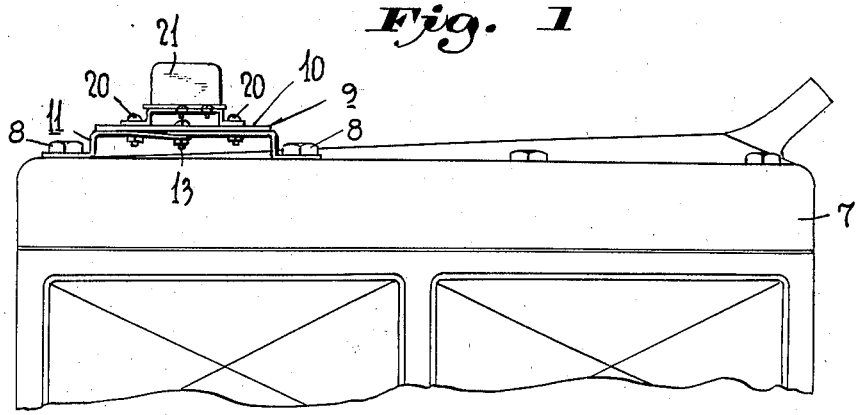
Fig. 1 is a side elevation of a portion of an engine block with my improved bracket mounted thereon and supporting a relay.
Figure 5:
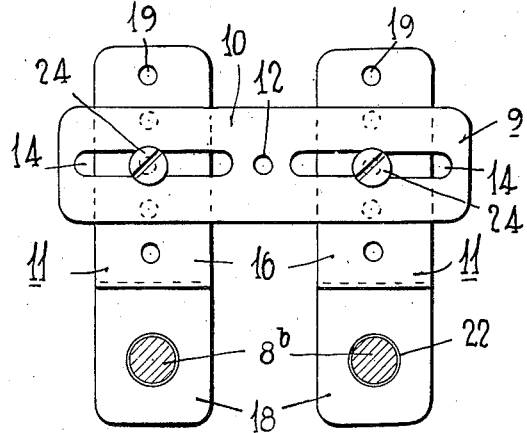
Fig. 5 is a plan view of the bracket with the elements forming a substantially H-shaped figure to fit bolts which are closer together.
Figure 4:
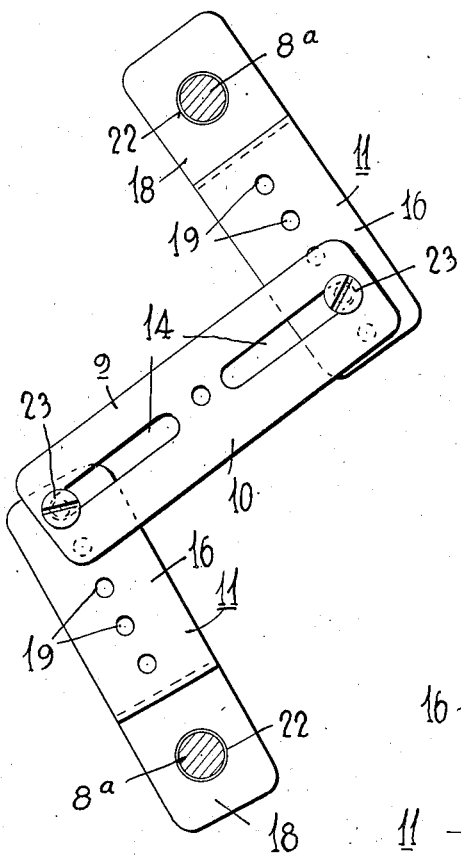
Fig. 4 is a plan view of the bracket with the elements thereof forming a substantially Z-shaped structure to accommodate engine head bolts which are further apart than those shown in Fig. 1.

In the event that the bolts 8 are further apart than in Fig. 1, the bracket may be extended into Z-shape as illustrated in Fig. 4. In this arrangement, bolts 23 may be passed through the slots 14, and certain of the holes 19, to rigidly secure the elements of the bracket together, and the engine bolts 8a can be passed through the apertures 22 in the feet of the end members.

Where the bolts 8b are relatively close together, as indicated in Fig. 5, the end members 11 may be arranged side by side with the intermediate member 9 forming a bridge connecting the top portions 16 of the angular members. Here again, bolts 24 pass through the slots 14, and certain of the holes 19, to rigidly secure the parts together.

Figure 6:
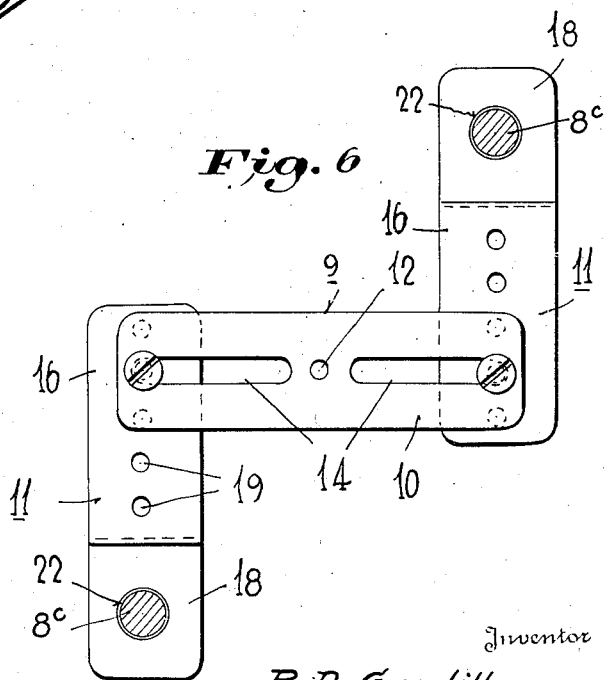
Fig. 6 is a view similar to Fig. 5, but with the bracket elements in still another position.

In Fig. 6, the intermediate member is shown at right angles to each of the end members 11 to accommodate bolts 8c spaced further apart than the bolts in Fig. 5, and closer together than the bolts in Fig. 4.

When the bracket is in any one of the forms shown in Figs. 4 to 6 inclusive, an article may be secured either to the intermediate member 9 or the tops of either of the end members 11 by placing bolts through the slots 14 or holes 12, 19.

While the device is illustrated particularly for use with the bolts of engine blocks, it will be obvious that it may be employed anywhere in a structure having bolts or the like spaced at varying distances from one another, and may be employed in mounting various articles in numerous positions.

It will be apparent to those skilled in the art that changes may be made in the details illustrated, without departing from the spirit of the invention as expressed in the following claims.

What I claim and desire to secure by Letters Patent is:

1. An adjustable bracket comprising a plurality of end members and an intermediate member, each end member having a substantially flat top portion, a leg and a foot, the leg connecting the foot to the top portion, the intermediate member being substantially flat and contacting the flat top portions of the end members, each of the top portions of the end members being provided with means adapted to permit a bolt to pass therethrough at various positions arranged lengthwise of said top portion, the intermediate member having means to allow bolts to pass therethrough at various positions lengthwise thereof, and bolt means passing through the bolt receiving means of the intermediate member and the top portions of the end members for rigidly securing said members together.

2. An adjustable bracket comprising a plurality of end members and an intermediate member, each end member having a substantially flat top portion, a leg and a foot, the leg connecting the foot to the top portion, the intermediate member being substantially flat and contacting the flat top portions of the end members, each of the top portions of the end members being provided with means adapted to permit a bolt to pass therethrough at various positions arranged lengthwise of said top portion, the intermediate member having means to allow bolts to pass therethrough at various positions lengthwise thereof, and bolt means passing through the bolt receiving means of the intermediate member and the top portions of the end members for rigidly securing said members together, the foot of each end member being substantially flat and provided with a bolt receiving aperture.

3. An extension bracket comprising a substantially flat top member provided midway of its length with a bolt receiving aperture, said member having elongated slots each extending from said aperture to a position in close proximity to an end of the member, a pair of angular members, each angular member consisting of a substantially flat top portion, a leg and a foot, said substantially flat top portions of the angular members being arranged beneath the top member and each top portion having a series of bolt receiving apertures extending lengthwise thereof, bolt means passing through the top member and through apertures of said top portions and rigidly securing the members together.

4. An extension bracket comprising a substantially flat top member provided midway of its length with a bolt receiving aperture, said member having elongated slots, each extending from said aperture to a position in close proximity to an end of the member, a pair of angular members, each angular member consisting of a substantially flat top portion, a leg and a foot, said substantially flat top portions of the angular members being arranged beneath the top member and each top portion having a series of bolt receiving apertures extending lengthwise thereof, bolt means passing through the top member and through apertures of said top portions and rigidly securing the members together, the foot of each angular member being substantially flat and having an aperture therethrough.

5. An extension bracket comprising a substantially flat top member provided midway of its length with a bolt receiving aperture, said member having elongated slots, each extending from said aperture to a position in close proximity to an end of the member, a pair of angular members, each angular member consisting of a substantially flat top portion, a leg and a foot, said substantially flat top portions of the angular members being arranged beneath the top member and each top portion having a series of bolt receiving apertures extending lengthwise thereof, bolt means passing through the top member and through apertures of said top portions and rigidly securing the members together, the foot of each angular member being substantially flat and apertured, and the leg of each of said angular members being arranged at right angles to the top portion and foot of that member.

6. The combination with an engine block having head bolts, of an extension bracket having apertured feet through which said head bolts pass, said bracket having legs extending upwardly from the feet, substantially flat top portions supported by the legs, each top portion having a series of apertures extending therethrough and arranged lengthwise of said top portion, a substantially flat top member resting on said top portions and provided with bolt receiving means, said means comprising an aperture arranged midway the length of the top member, and elongated slots extending from points adjacent to the last mentioned aperture to points in close proximity to the ends of the top member, and bolt means passing through the bolt receiving means of the top member and apertures of said top portions for rigidly securing the top member to said top portions, said top member and top portions forming means whereby an article may be mounted on the engine block.

PERCY D. GANDILLON.